United States Patent [19]

Pugin et al.

[11] 3,996,191
[45] Dec. 7, 1976

[54] PROCESS FOR THE DOPE DYEING OF LINEAR POLYESTERS

[75] Inventors: André Pugin, Riehen; Kurt Burdeska, Basel; Jost von der Crone, Riehen, all of Switzerland

[73] Assignee: Ciba-Geigy AG, Basel, Switzerland

[22] Filed: Nov. 10, 1971

[21] Appl. No.: 197,489

[30] Foreign Application Priority Data
Nov. 20, 1970 Switzerland .................. 17232/70

[52] U.S. Cl. .......................... 260/40 P; 260/246 R
[51] Int. Cl.² ........................................ C08K 5/35
[58] Field of Search .............. 260/40 P, 246 R, 246

[56] References Cited
UNITED STATES PATENTS

| | | | |
|---|---|---|---|
| 3,309,213 | 3/1967 | Pugin et al. | 260/246 R X |
| 3,391,104 | 7/1968 | Harris et al. | 260/246 R X |
| 3,489,713 | 1/1970 | Bowman et al. | 260/40 P |
| 3,523,117 | 8/1970 | Pugin et al. | 260/246 R |

OTHER PUBLICATIONS

Def. Pub. T883,028 to Newland et al., filed 3-29-68.

*Primary Examiner*—Donald E. Czaja
*Assistant Examiner*—S. M. Person
*Attorney, Agent, or Firm*—Wenderoth, Lind & Ponack

[57] ABSTRACT

A process for the dope dyeing of linear polyesters, which comprises the use of dyestuffs of the formula

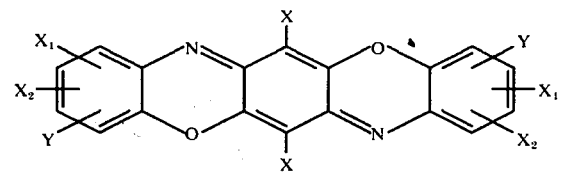

wherein X represents chlorine or bromine, Y represents an etherified oxy group, $X_1$ represents a hydrogen or halogen atom, an alkyl group, an etherified oxy group, a trifluoromethyl, cyano or alkylsulphonyl group, and $X_2$ represents a hydrogen or halogen atom, and the dyed polyesters obtained according to this process or having incorporated a dyestuff of the above mentioned formula.

3 Claims, No Drawings

PROCESS FOR THE DOPE DYEING OF LINEAR POLYESTERS

The present invention relates to a process for the dope dyeing of linear polyesters with dyestuffs of the formula

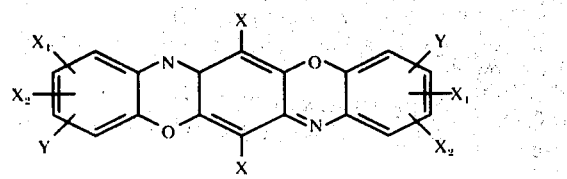

wherein X represents chlorine or bromine, Y represents an etherified oxy group, $X_1$ represents a hydrogen or halogen atom, an alkyl group, an etherified oxy group, a trifluoromethyl, cyano or alkylsulphonyl group, and $X_2$ represents a hydrogen or halogen atom.

Particular interest attaches to dyestuffs of the formula

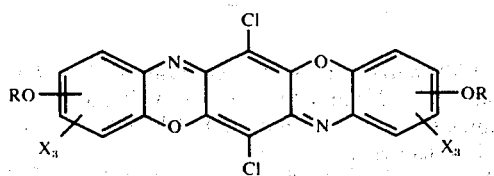

wherein R represents an aliphatic, alicyclic, araliphatic, aromatic or heterocyclic radical, in particular an alkyl, hydroxyalkyl, aryloxyalkyl, alkoxyalkyl, cycloalkyl, aralkyl or aryl group, and $X_3$ represents a hydrogen or halogen atom, an alkyl group containing 1–6 carbon atoms, a cyano or alkylsulphonyl group or the radical RO-.

The radicals RO- are preferably in the m-position to the oxygen or nitrogen atom of the oxazine ring and contain preferably 1–12 carbon atoms.

As examples there may be mentioned: methoxy, ethoxy, propoxy, isopropoxy, butoxy, isobutoxy, tert. butoxy, amyloxy, hexyloxy, octyloxy, decyloxy or dodecyloxy groups. Exemplary, of hydroxyalkoxy groups are β-hydroxyethoxy, γ-hydroxypropoxy or δ-hydroxybutoxy groups. From the series of the alkoxyalkoxy mention may be made of the β-methoxyethoxy or β-ethoxyethoxy the groups. Radicals which are derived from polyglycols are also suitable.

As acyloxyalkoxy groups there may be mentioned β-acetoxyethoxy, β-propionyloxy-ethoxy, β-iso or β-benzoyloxyethoxy groups. As an example of an aryloxyalkoxy group the β-phenoxyethoxy group may be cited, and as phenalkoxy groups there may be mentioned benzyloxy, α- or β-phenylethoxy groups. From the series of the aryloxy groups there may be mentioned phenoxy, o- or p-chlorophenoxy, 2,4-dichlorophenoxy, 2,5-dichlorophenoxy, 2,4,5-trichlorophenoxy, o- or p-methylphenoxy, 2,4- or 2,6-dimethylphenoxy, 2,4,6-trimethylphenoxy, p-tert.butylphenoxy, p-amylphenoxy, o-, m- or p-methoxy-phenoxy, p-phenylphenoxy, p-phenoxyphenoxy, β-naphthoxy, 2-(5,6,7,8-tetrahydro)-naphthoxy or 1-(1,2,3,4-tetrahydro)-naphthoxy groups. In conclusion, mention may also be made of oxy groups etherified with heterocyclic radicals, for example the tetrahydrofurfuryloxy group.

Listed herewith below are some examples of dyestuffs which are suitable for the process according to the invention: 2,6-dimethoxy-9,10-dichloro-triphendioxazine 4,8-dimethoxy-9,10-dichloro-triphendioxazine 3,7-dimethoxy-9,10-dichloro-triphendioxazine 1,5-dimethoxy-9,10-dichloro-triphendioxazine 2,6-diethoxy-9,10-dichloro-triphendioxazine 2,6-dipropoxy-9,10-dichloro-triphendioxanzine 2,6-diisopropoxy-9,10-dichloro-triphendioxazine 2,6-di-(β-hydroxyethoxy)-9,10-dichloro-triphendioxazine 2,6-di-(β-ethoxyethoxy)-9,10-dichloro-triphendioxazine 2,6-di-(β-propoxyethoxy)-9,10-dichloro-triphendioxazine 2,6-di-(β-acetoxyethoxy)-9,10-dichloro-triphendioxazine 2,6-di-(β-phenoxyethoxy)-9,10-dichloro-triphendioxazine 2,6-di-[β-(p-chlorophenoxy)-ethoxy]-9,10-dichloro-triphendioxazine 2,6-dibenzyloxy-9,10-dichloro-triphendioxazine 2,6-di-(β-phenethoxy)-9,10-dichloro-dichloro-triphendioxazine 2,6-di-[β-(p-chlorphenylethoxy)]-9,10-dichloro-triphendioxazine-2,6-di-(β-cyanethoxy)-9,10-dichloro-triphendioxazine 2,6-di(α-tetrahydrofuryloxy)-9,10-dichloro-triphendioxazine 2,6-diphenoxy-9,10-dichloro-triphendioxazine 2,6-di(o-chlorophenoxy)-9,10-dichloro-triphendioxazine 2,6-di-(p-chlorophenoxy)-9,10-dichloro-triphendioxazine 2,6-di-(2',4'-dichlorophenoxy)-9,10-dichloro-triphendioxazine 2,6-di-(2',4',6'-trichlorophenoxy)-9,10-dichloro-triphendioxazine 2,6-di-(o-methylphenoxy)-9,10-dichloro-triphendioxazine 2,6-di-(p-methylphenoxy)-9,10-dichloro-triphendioxazine 2,6-di-(2',4'-dimethylphenoxy)-9,10-dichloro-triphendioxazine 2,6-di-(2',6'-dimethylphenoxy)-9,10-dichloro-triphendioxazine 2,6-di-(2',4',6'-trimethylphenoxy)-9,10-dichloro-triphendioxazine. 2,6-di-(p-tert.butylphenoxy)-9,10-dichloro-triphendioxazine 2,6-di-(β-amylphenoxy)-9,10-dichloro-triphendioxazine 2,6-di-(p-diphenyloxy)-9,10-dichloro-triphendioxazine 2,6-di-(p-phenoxyphenoxy)-9,10-dichloro-triphendioxazine 2,6-di-(3'-methoxyphenoxy)-9,10-dichloro-triphendioxazine 2,6-di-(4'-methoxyphenoxy)-9,10-dichloro-triphendioxazine 2,6-di-(4'-methylsulphonylphenoxy)-9,10-dichloro-triphendioxazine 2,6-di-(β-naphthoxy)-9,10-dichloro-triphendioxazine 2,6-di-[2'-(5',6',7',8'-tetrahydro)-naphthoxy]-9,10-dichlorotriphendioxazine 2,6-di-[1'-(1',2',3',4'-tetrahydro)-naphthoxy]-9,10-dichlorotriphendioxazine 2,6-dimethoxy-1,5,9,10-tetrachloro-triphendioxazine 2,6-diethoxy-1,5,9,10-tetrachloro-triphendioxazine 2,6-dibenzyloxy-1,5,9,10-tetrachloro-triphendioxazine 2,6-diphenoxy-1,5,9,10-tetrachloro-triphendioxazine 2,6-dimethoxy-1,5-dibromo-9,10-dichloro-triphendioxazine 2,6-diphenoxy-1,5-dibromo-9,10-dichloro-triphendioxazine 2,6-di-(p-chlorophenoxy)-1,5,9,10-tetrachloro-triphendioxazine 2,6-dimethoxy-3,7,9,10-tetrachloro-triphendioxazine 2,6-diphenoxy-3,7,9,10-tetrachloro-triphendioxazine 2,6-di-(p-chlorophenoxy)-3,7,9,10-tetrachloro-triphendioxazine 2,6-di-(2',4',5'-trichlorophenoxy)-3,7,9,10-tetrachloro-triphendioxazine 2,6-diphenoxy-3,7-dibromo-9,10-dichloro-triphendioxazine 3,7-dimethoxy-2,6,9,10-tetrachloro-triphendioxazine 3,7-diethoxy-2,6,9,10-tetrachloro-triphendioxazine 1,2,5,6-tetramethoxy-9,10-dichloro-triphendioxazine 2,6,3,7-tetramethoxy-1,5,9,10-tetrachloro-triphendioxazine 2,6-dimethoxy-1,5-dicyano-9,10-dichloro-triphendioxazine 2,6-dimethoxy-1,5-di-(methylsulphonyl)-9,10-dichloro-triphendioxazine 2,6-di-(p-methylsulphonylphenoxy)-1,5,9,10-tetrachloro-triphendioxazine.

The cited dioxazines constitute for the most part compounds which can be manufactured according to the conventional processes.

The linear polyesters to be dyed, in particular polyethylene terephthalate, are intimately mixed with the dyestuff appropriately in the form of powder, chips or granules. This may be done, for example, by sprinkling the polyester particles with the finely distributed dry dyestuff powder, or by treating the polyester particles with a solution of the dyestuff in an organic solvent and subsequently removing the solvent.

Finally, the dyestuff can also be added directly to the fused polyester or also before or during the polycondensation of the polyethylene terephthalate.

Depending on the desired tinctorial strength, the ratio of dyestuff to polyester can vary within wide limits. In general it is advisable to use 0.01-2 parts of dyestuff to 100 parts of polyester.

The polyester particles so treated are fused in an extruder according to known processes and pressed into objects, particularly sheets or fibres, or cast in the form of boards.

Uniformly and deeply coloured objects possessing excellent fastness to light and migration are obtained. The fibres obtained according to the process of the invention are distinguished moreover by outstanding fastness to wet processing and dry cleaning.

A particular advantage of the dyestuffs used according to the invention resides in the fact that they dissolve in the polyester melt and withstand high temperatures up to 300° C without decomposing, so that substantially clearer dyeings are obtained than with the use of insoluble pigments.

The following Examples illustrate the invention, the parts and percentages being by weight unless otherwise stated.

EXAMPLE 1

1 Part of the dyestuff of the formula

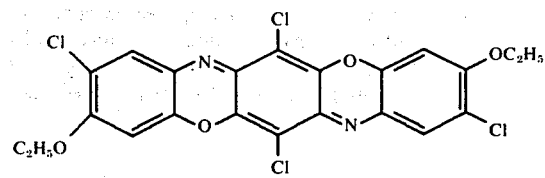

and 1000 parts of polyethylene terephthalate granules (diameter: 1-2 mm) are very thoroughly mixed for 10 minutes in a mixing drum on a roll mill rotating at 70 revolutions per minute.

The dry, coloured granules are processed at 270° C in an injection extruder. Pure bluish red coloured boards of very good fastness to light are obtained.

In the following table further dyestuffs are listed with which polyethylene terephthalate is coloured according to the process described in paragraph 1. The symbols $R_1$, $R_2$, $R_3$ and $R_4$ of columns 1-4 correspond to the substituents of the general formula given below and the last column indicates the shade of the resulting 2 mm thick boards manufactured by injection extrusion and coloured to a strength of 0.1%.

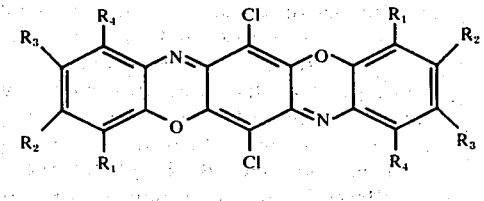

Table

| No. | $R_1$ | $R_2$ | $R_3$ | $R_4$ | shade |
| --- | --- | --- | --- | --- | --- |
| 1 | H | H | H | —OCH$_3$ | orange |
| 2 | H | H | —OCH$_3$ | H | brown |
| 3 | H | —OCH$_3$ | H | H | red |
| 4 | H | —OC$_2$H$_5$ | H | H | red |
| 5 | H | —O—⟨phenyl⟩ | H | H | scarlet |
| 6 | H | —Cl | —OC$_2$H$_5$ | H | scarlet |
| 7 | —OCH$_3$ | H | H | H | scarlet |
| 8 | —CN | —OCH$_3$ | H | H | orange |
| 9 | Cl | —OCH$_3$ | —OCH$_3$ | H | orange |

Table-continued

| No. | R₁ | R₂ | R₃ | R₄ | shade |
|---|---|---|---|---|---|
| 10 | Br | —OCH₃ | H | H | scarlet |
| 11 | —SO₂CH₃ | —OCH₃ | H | H | orange red |
| 12 | H | —O—CH₂—CH₂—OH | H | H | red |
| 13 | H | —OCH₂—CH₂—OC₂H₅ | H | H | bluish red |
| 14 | H | —O—CH₂—CH₂—OCOCH₃ | H | H | red |
| 15 | H | —O—CH(CH₂—)CH₂—O (tetrahydrofurfuryl) | H | H | bluish red |
| 16 | H | —O—CH₂—C₆H₅ | H | H | red |
| 17 | H | —OCH₂—CH₂—O—C₆H₅ | H | H | bluish red |
| 18 | H | —O—CH₂—CH₂—C₆H₄—Cl | H | H | red |
| 19 | H | —OC₃H₇ | H | H | bluish red |
| 20 | H | —O—CH(CH₃)₂ | H | H | bluish red |
| 21 | Cl | —O—CH₂—C₆H₅ | H | H | claret |
| 22 | H | —OCH₂—CH₂—OCH₂—CH₂—CH₃ | H | H | red |
| 23 | H | —O—C₆H₅ | H | H | scarlet |
| 24 | H | —O—C₆H₄—CH₃ | Cl | H | red |
| 25 | Cl | —O—C₆H₅ | H | H | scarlet |
| 26 | Cl | —O—C₆H₄—Cl (o-Cl) | H | H | orange |
| 27 | H | —O—C₆H₄—OCH₃ (m-OCH₃) | Cl | H | red |
| 28 | H | —O—C₆H₂(CH₃)₃ | H | H | red |
| 29 | Br | —O—C₆H₂Cl₃ | H | H | red |
| 30 | H | —O—C₆H₄—Cl | —OCH₃ | H | bluish red |

Table-continued

| No. | R₁ | R₂ | R₃ | R₄ | shade |
|---|---|---|---|---|---|
| 31 | H | −O−⬡−C₅H₁₁ | −OC₂H₅ | H | bluish red |
| 32 | H | −O−⬡−OCH₃ | −OC₃H₅ | H | bluish red |
| 33 | H | −O−(phenyl with 2,3-diCH₃) | −OCH₃ | H | bluish red |
| 34 | Cl | −O−⌬−SO₂CH₃ | H | H | red |
| 35 | H | −O−⌬−⌬ | −OCH₃ | H | bluish red |
| 36 | H | −O−⌬−O−⌬ | −OC₂H₅ | H | bluish red |
| 37 | H | −O−(naphthyl) | −OCH₃ | H | bluish red |
| 38 | H | −O−(2,6-diCH₃ phenyl) | −OCH₂−CH₂−OH | H | bluish red |
| 39 | H | −O−(tetrahydronaphthyl) | −OCH₃ | H | bluish red |
| 40 | H | −O−⌬−⌬ | Cl | H | red |
| 41 | H | −OC₂H₅ | −CF₃ | H | red |
| 42 | H | −O−⌬ | −CF₃ | H | red |

EXAMPLE 2

1000 Parts of polyethylene terephthalate and 1 part of triethyl phosphite are thoroughly mixed in a mixing drum. Upon addition of 2.5 parts of the dyestuff of the formula

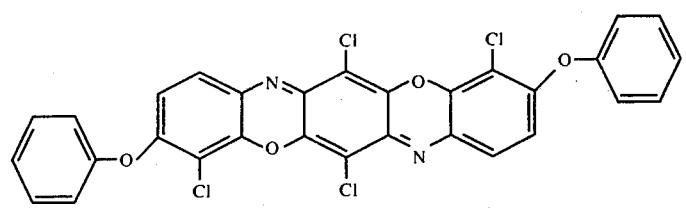

mixing is continued for a further 15 minutes and the mixture is then dried for 10–12 hours at 120° in vacuo. The so treated granules are spun according to the melt spinning process at 250°–275° C.

Pure, intensely dyed scarlet red fibres having very good fastness to light, washing, chlorine, and migration are obtained.

We claim:
1. A polyester having incorporated therein a dyestuff of the formula

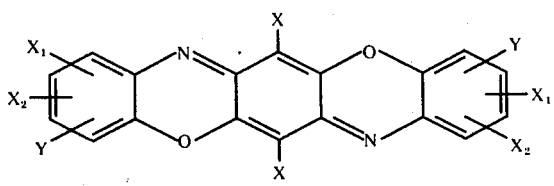

wherein X represents chlorine or bromine, Y represents an etherified oxy group, $X_1$ represents hydrogen, halogen, alkyl, an etherified oxy group, trifluoromethyl, cyano or alkylsulphonyl and $X_2$ represents hydrogen or halogen.

2. The dyed polyester according to claim 1, wherein the dyestuff is of the formula

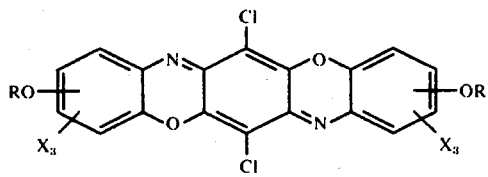

wherein R represents an aliphatic, alicyclic, araliphatic, aromatic or heterocyclic radical and $X_3$ represents hydrogen, halogen, alkyl containing 1–6 carbon atoms, cyano, alkyl sulphonyl or the radical RO.

3. The dyed polyester according to claim 2, wherein R of the dyestuff represents alkyl, hydroxyalkyl, aryloxyalkyl, alkoxyalkyl, cycloalkyl, aralkyl or aryl.

* * * * *